United States Patent [19]

Schmid et al.

[11] Patent Number: 4,842,695
[45] Date of Patent: Jun. 27, 1989

[54] ARRANGEMENT OF A DRY COOLER FOR COKE

[75] Inventors: Karl Schmid; Friedrich Jokisch, both of Essen; Dieter H. W. Heese, Bochum, all of Fed. Rep. of Germany; Bruno Hillinger, Hinterbruehl, Austria; Georg Beckmann; Norbert Heger, both of Vienna, Austria

[73] Assignee: Krupp Koppers GmbH, Essen, Fed. Rep. of Germany

[21] Appl. No.: 585,018

[22] Filed: Mar. 2, 1984

Related U.S. Application Data

[63] Continuation of Ser. No. 449,493, Dec. 13, 1982, abandoned.

[30] Foreign Application Priority Data

Jan. 27, 1982 [DE] Fed. Rep. of Germany ....... 3202573

[51] Int. Cl.$^4$ ............................................. C10B 39/00
[52] U.S. Cl. ....................................... 202/228; 201/39
[58] Field of Search .............. 202/228; 201/39; 34/20, 34/62; 432/77

[56] References Cited

U.S. PATENT DOCUMENTS

| 3,795,987 | 3/1974 | Kemmetmueller | 202/228 |
| 3,848,344 | 11/1974 | Kemmetmueller | 202/228 |
| 4,141,795 | 2/1979 | Koizumi et al. | 202/228 |
| 4,178,696 | 12/1979 | Beckmann et al. | 202/228 |
| 4,212,706 | 7/1980 | Koizumi et al. | 202/228 |
| 4,354,438 | 10/1982 | Beckmann | 202/228 |
| 4,368,103 | 1/1983 | Weinzierl et al. | 202/228 |
| 4,370,202 | 1/1983 | Weber et al. | 202/228 |

FOREIGN PATENT DOCUMENTS 2455496  7/1975  Fed. Rep. of Germany .

Primary Examiner—Peter Kratz
Attorney, Agent, or Firm—Michael J. Striker

[57] ABSTRACT

A dry cooling installation for coke includes an upright cooling shaft having an upper inlet for coke to be cooled and a lower inlet for a recirculating counter-stream of cooling gas. Two gas discharge ducts are connected at two opposite points to the cooling shaft and communicate respectively with dust separators. A waste gas heat boiler is arranged between the separator and communicates with the same so as to receive clean gas in a direction which is substantially perpendicular to the movement of separated dust particles.

4 Claims, 3 Drawing Sheets

ARRANGEMENT OF A DRY COOLER FOR COKE

This applicaiton is a continuation of application Ser. No. 449,493, filed Dec. 13, 1982, now abandoned.

BACKGROUND OF THE INVENTION

The present invention relates in general to dry cooling installations for coke, and in particular to a dry cooler of the type having an upright shaft for receiving coke to be cooled off, means for recirculating a cooling gas in the shaft, a dust separator for the gas stream and a waste heat boiler for utilizing the heat content of the gas.

In conventional dry cooling installations of the above described type, hot coke introduced into the cooling shaft is cooled down by a counterstream of a cooling gas which is introduced from below and flows upwardly through the coke. During this upward movement, the gas stream of necessity always entrains coke dust particles. Upon discharge from the shaft, the cooling gas stream usually passes through a waste heat boiler so as to transfer its heat content to the latter. It is desirable that the coke dust particles be separated before the gas stream enters the boiler, because if no dust removal is provided then the dust would precipitate on the boiler, thus causing wear ad clogging of heat-exchanging surfaces and impairing the conditions for the heat exchange.

It has already been devised to remove the dust from the hot cooling gas emanating from the cooling shaft by means of an impact separator, a gravity separator, or by a cyclone. This kind of separation is described, for example, in the German publication No. 24 55 496.

In this prior-art arrangement, the dust removing aggregates are spaced apart from the boiler. Consequently, the whole installation requires an additional space especially in the case of gravity separators. In addition, when in such known arrangements impact separators are used, the effectiveness of separation is unfavorably influenced by the fact that dust falling by gravity out of the gas stream is crossed and re-entrained by the latter. The application of cyclones for removing dust particles from hot gas streams having a temperature of about 800° C. and supplied in large quantities (about 1500 cubic meters per ton of coke, whereby cubic meter is measured at 0° C. and at a pressure of 1.013 bar) is limited from the economic point of view.

SUMMARY OF THE INVENTION

It is therefore a general object of the present invention to overcome the aforementioned disadvantages.

More particularly, it is an object of the invention to provide an improved arrangement of the cooling shaft, of the separator and of the waste heat boiler in the coke dry cooling installation, which results in an optimum efficiency of the employed dust separator, requires reduced installation space, and eliminates the crossing of separated dust particles by the gas stream.

In keeping with these objects and others which will become apparent hereafter, one feature of the invention resides in the provision of two discharge ducts communicating at one end thereof with the upright cooling shaft and at the other end thereof with two dust separators which in turn communicate with two opposite sides of the waste heat boiler.

In a further elaboration of this invention, the purified cooling gas in the separators enters the waste heat boiler in a direction which is substantially perpendicular to the direction of falling of the separated dust particles in the separators.

In a preferred embodiment, the two separators are installed in the waste heat boiler and are bounded by the cooling surfaces of the boiler.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
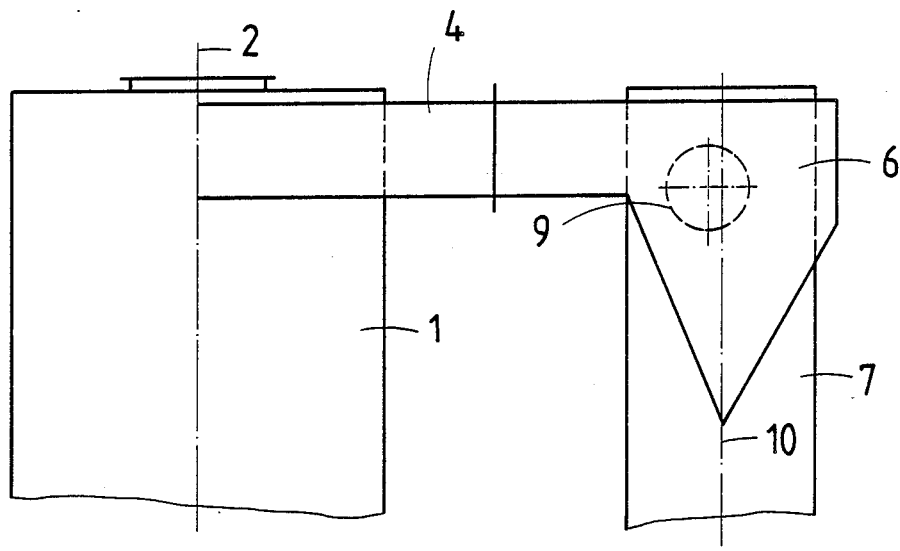
FIG. 1 is a schematic side view of an embodiment of the dry cooling installation of this invention.
Figure 2:
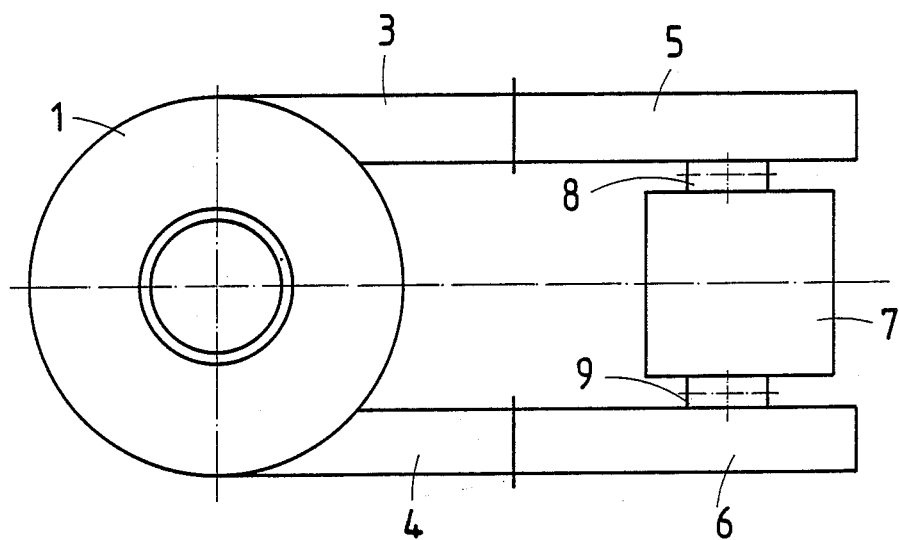
FIG. 2 is a top view of the installation of FIG. 1.

In FIGS. 1 and 2, reference numeral 1 indicates a cooling shaft provided with a top inlet 2 through which hot coke to be cooled off is introduced. A counterstream of cooling gas flows from below upwardly through the charged coke and is heated thereby to a high temperature. The heated cooling gas is discharged from the cooling shaft through a pair of discharge ducts 3 and 4 connected parallel to each other in tangential direction to the upper region of the shaft 1. Each of the dust discharge ducts 3 and 4 is connected to an assigned dust separator 5 and 6 which are arranged close to two opposite sides of a waste gas heat boiler 7 and connected thereto by short connections 8 and 9.

In this embodiment of the invention, heat gas stream flows through ducts 3 and 4 in respective separators 5 and 6 where it is deviated to flow at right angles through connections 8 and 9 in the waste heat boiler. Due to this sudden deviation of the discharged gas streams, most coke dust particles entrained in the streams are separated by inertia and impact against the end walls of the separators. The separated dust is then collected at the sloping bottom of each separator and is discharged at the bottom outlet 10. The path of movement of the separated cooling gas from the separator in the boiler is therefore substantially perpendiculr to the direction of movement of the separated coke dust particles. Consequently, the dust by virtue of this arrangement is not recaptured by the cooling gas as is the case in prior-art separators.

An additional advantage of the arrangement according to this invention is the fact that the two separators are in alignment with the assigned gas discharge ducts directed tangentially from the cooling shaft 1. As a result, the separators occupy only lateral spaces adjoining the waste heat boiler, which is of smaller size than the cooling shaft, whereby the space between the boiler and the shaft is free.

In a modification, instead of the illustrated impact separators, it is possible to use cyclones.

Figure 3:
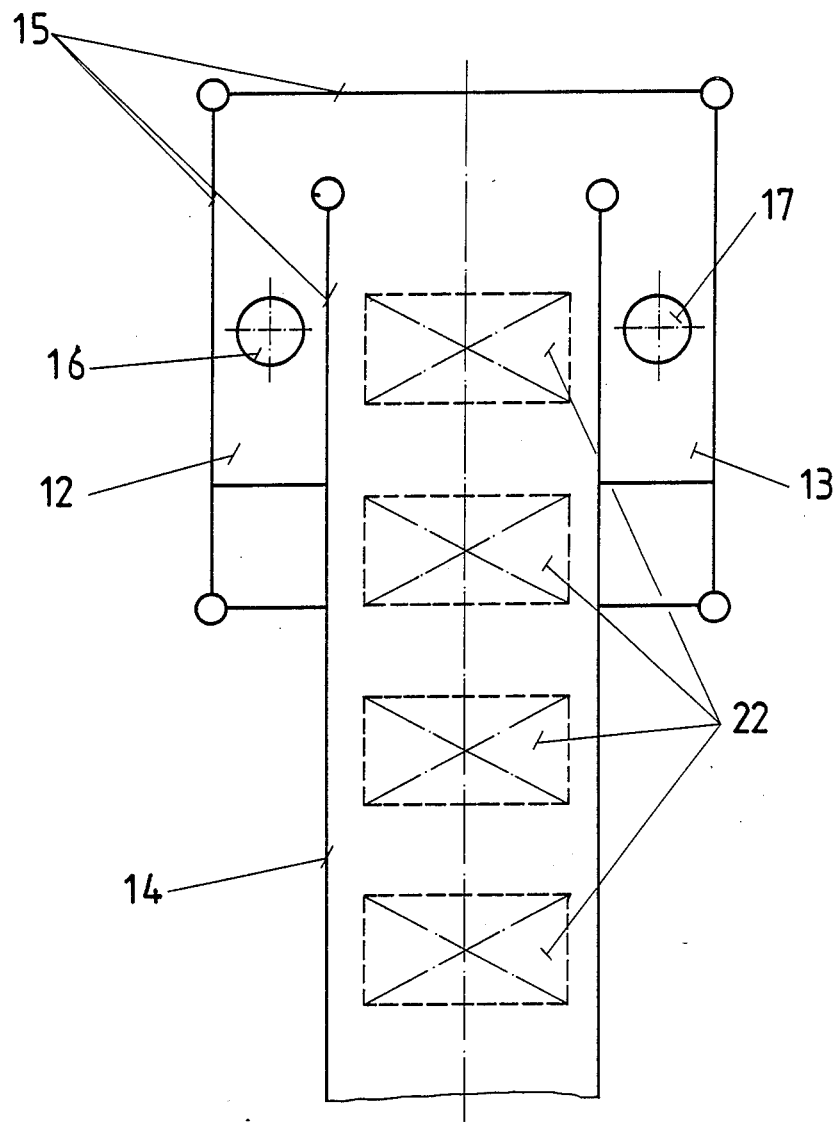
FIG. 3 is an elevational view of another embodiment of the arrangement of the separators and of the waste heat boiler.
Figure 4:
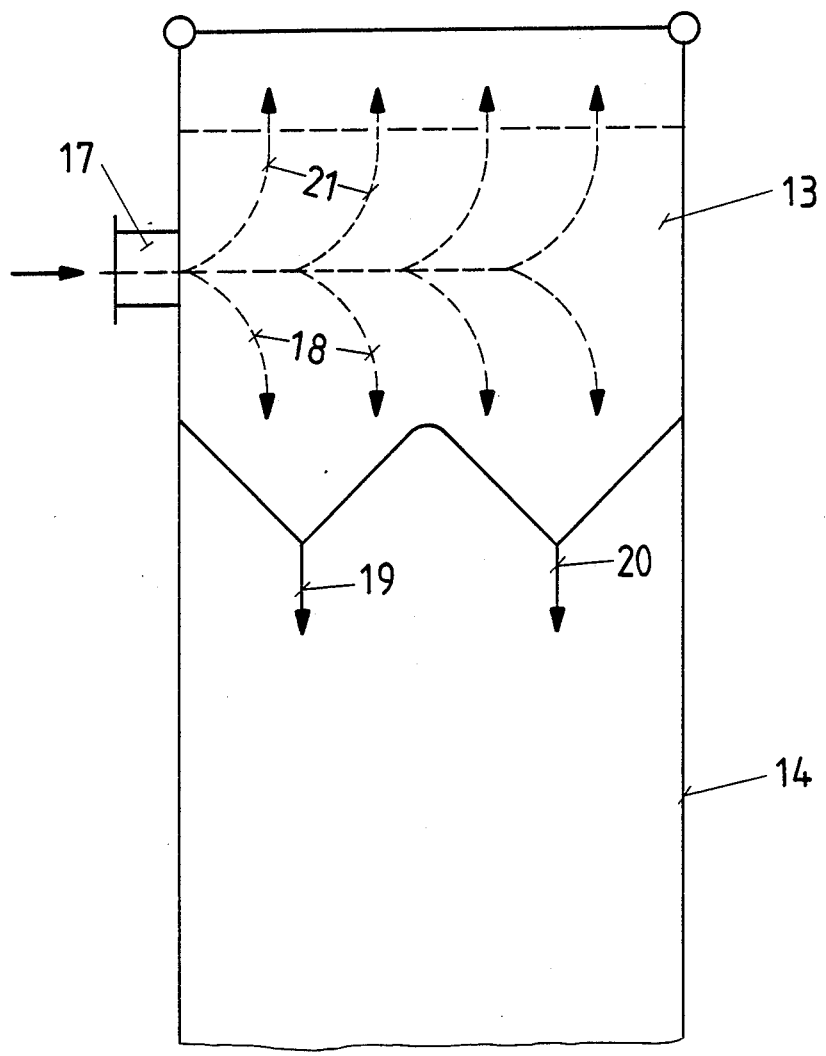
FIG. 4 is a side view of the arrangement of FIG. 3.

In the embodiment according to FIGS. 3 and 4, the dust separators 12 and 13 are combined with the waste heat boiler 14 into a single unit; that is, the heat-exchanging pipe arrys 22 of the boiler communicate with the outer wall 15 bounding the two dust separators. Inlet ports 16 and 17 in respective separators are connected to the discharge ducts 3 and 4 similarly as in the preceding example. Arrows 18 in FIG. 4 indicate the path of movement of the dust particles separated from the gas stream and falling into collecting bins at the bottom of each separator. The dust particles are then discharged through conduits 19 and 20. The clean cooling gas is then diverted upwardly and then at right angles to the path of movement of the falling particles to flow past the heat-exchanging surfaces 22 of the boiler.

It will be understood that each of the elements described above, or two or more together, may also find a useful application in other types of constructions differing from the types described above.

While the invention has been illustrated and described as embodied in specific examples of the coke dry cooling installation, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. An arrangement of a dry cooler for coke including an upright cooling shaft provided with an upper inlet for coke to be cooled and a lower inlet for a recirculating counterstream of cooling gas, comprising two gas discharge ducts connected side-by-side to said cooling shaft and each terminating in a dust separator; and a waste heat boiler arranged between and communicating at opposite lateral sides thereof with said separators so that streams of cleaned cooling gas from the latter enter the boiler substantially at right angles to the direction of movement of the dust-gas streams from said ducts.

2. An arrangement as defined in claim 1, wherein the separators and waste heat boiler are arranged and constructed such that the streams of cleaned cooling gas from said separators enter said waste heat boiler in a direciton which is substantially perpendicular to the downward movement of the separated dust particles.

3. An arrangement as defined in claim 1, wherein said separators and said waste heat boiler are combined into a single unit having common separating walls.

4. An arrangement as defined in claim 1, wherein said separators are impact separators each having an inlet opening in alignment with the corresponding gas duct and an outlet arranged at right angles to the path of movement of separated particles.

* * * * *